Jan. 13, 1953     C. L. NORTON, JR     2,625,463

METHOD FOR PRODUCING HYDROGEN CYANIDE

Filed April 27, 1946

INVENTOR
Charles L. Norton, Jr.
BY
ATTORNEY

Patented Jan. 13, 1953

2,625,463

UNITED STATES PATENT OFFICE 2,625,463

METHOD FOR PRODUCING HYDROGEN CYANIDE

Charles L. Norton, Jr., New York, N. Y., assignor to The Babcock & Wilcox Company, Rockleigh, N. J., a corporation of New Jersey Application April 27, 1946, Serial No. 665,353

4 Claims. (Cl. 23—151)

This invention relates in general to methods of and apparatus suitable for the fixation of nitrogen, more particularly it relates to methods of and apparatus for the production of nitrogen compounds from atmospheric nitrogen at high temperatures and atmospheric pressures.

In spite of the fact that there has been a great deal of investigation on the fixation of atmospheric nitrogen at high temperatures, no commercially operable process other than the arc process has been previously developed, and even this process is rapidly losing out to the calcium cyanide and synthetic ammonia process in view of the unfavorably high investment cost per ton of product, the need to locate the plant in places where electric power is plentiful and its very low efficiency in energy utilization.

The general object of the invention is the provision of an improved method of and apparatus for the fixation of atmospheric nitrogen. A further object is the provision of a commercially practical process of and apparatus for producing nitrogen compounds at elevated temperatures and atmospheric pressures.

Still another object of this invention is the proviosion of a process and apparatus of the character described which is adapted for continuous operation and in which the yields obtainable are considerably higher than those normally obtained in present commercial practice.

In accordance with my invention these and other objects and advantages which are incidental to its application can be attained by preheating gases containing nitrogen to a relatively high temperature preferably about 1800 F., passing the preheated gases through a combustion chamber of a furnace in which they are raised to the desired temperature, passing the hot gases into and through a reaction zone in which they are brought into intimate contact with the other component of the reaction, and shock-cooling the reaction products as they leave the reaction zone.

In the accompanying drawings which illustrate preferred forms of apparatus embodying features of this invention.

Figures 1, 2, 3:
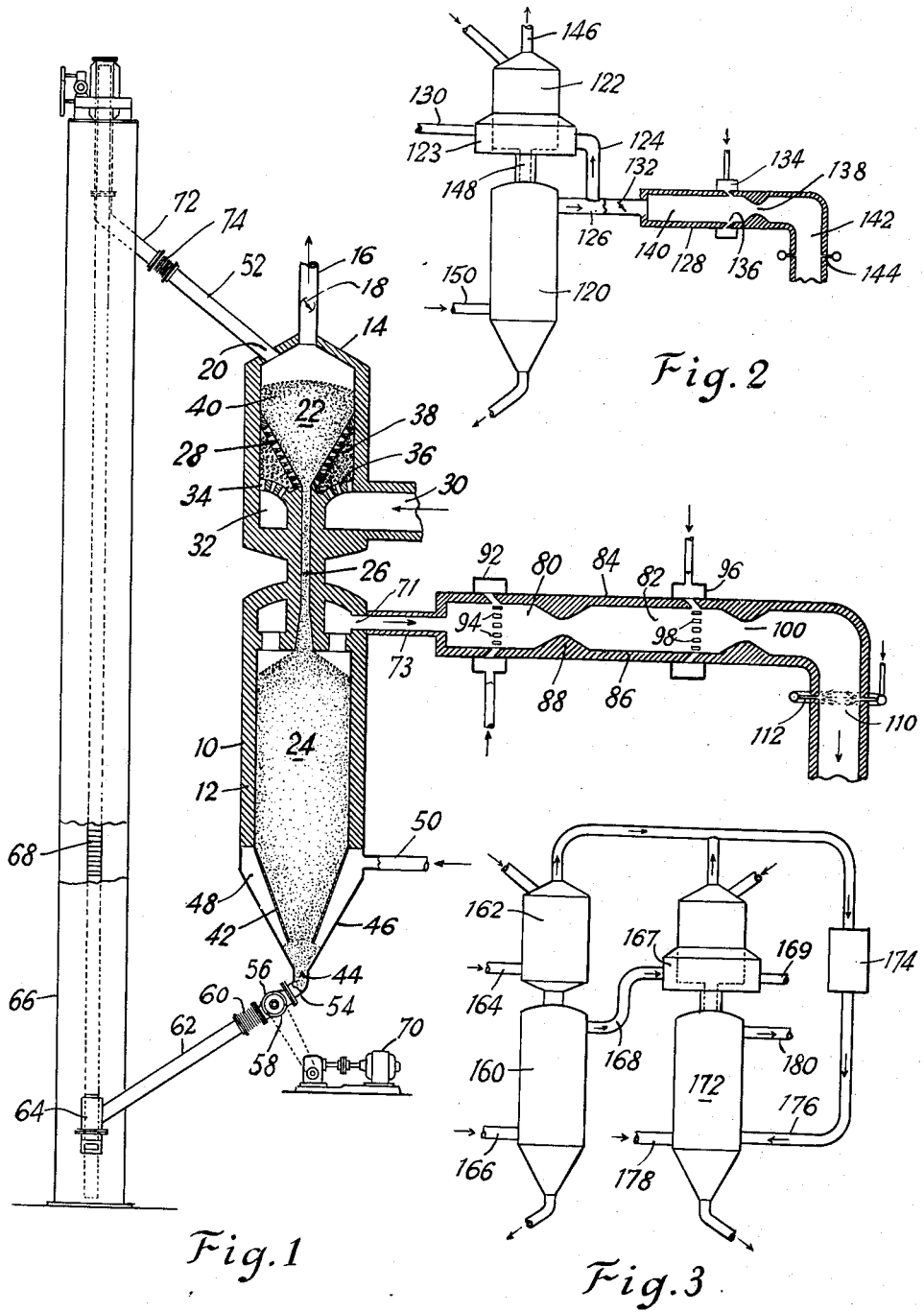
Fig. 1 is a somewhat diagrammatic elevation, partly in section, of a preferred form of apparatus embodying the invention suitable for use in the fixation of atmospheric nitrogen.
Fig. 2 is a somewhat diagrammatic elevation, partly in section, of a modified form of furnace.
Fig. 3 is a somewhat diagrammatic representation of a modified arrangement of apparatus for carrying out the process of this invention.

While the invention in its broader aspects is applicable to all types of gaseous reactions which can be carried out at extremely high temperatures, the apparatus illustrated in the drawings is particularly designed and especially adapted for the fixation of atmospheric nitrogen.

In accordance with the present invention as illustrated in Fig. 1 of the drawings air is preheated in a vertically elongated fluid heater having a substantially cylindrical fluid tight casing 10 lined with an annular wall of high temperature refractory material 12. The upper end of the heater is formed by a conical plate 14 also lined with high temperature refractories and having a central heating gas outlet 16 controlled by a damper 18. An inlet 20 for solid heat transfer material is arranged in one side of plate 14. The interior of the fluid heater is divided into an upper chamber 22 in which the solid heat transfer material is heated to a predetermined temperature and a lower chamber 24 in which the air feed is preheated by heat absorption from the heat transfer material therein. The refractory lining 12 is cylindrical in shape with a conical bottom being provided for both the upper chamber 22 and the lower chamber 24, and an unobstructed connecting throat passage 26 of circular cross-section and substantially smaller diameter than the average diameter of either chamber 22 or 24. The conical bottom structure of the upper chamber which supports the fluent mass of heat transfer material and directs its flow downwardly into the upper end of the throat 26 is formed of generally cubical tuyère blocks 28 through which the heating gases are delivered to the upper chamber. The heating gases come into the heater through the inlet pipe 30 and annular chamber 32, pass upwardly through the openings 34 in arch 36 and thence through the interstices in the stationary inert refractory bed 38 out through the opening in the tuyère blocks 28 into the lower portion of the upper chamber 22. These hot gases during their flow upwardly through the chamber in countercurrent relation with the descending fluent mass of heat transfer material 40 give off their heat content to the solid particles with which they come in contact. The lower end of the lower chamber 24 is formed by an inverted frusto-conical screen 42 open at its lower end and concentrically arranged with respect to a central opening 44 in the inverted conical bottom 46 of the casing. The annular space between the screen 42 and casing bottom 46 forms an inlet chamber 48 for the air which is supplied thereto through pipe 50 above the upper end of the screen 42.

In operation the chambers 22 and 24 and throat 26 of the preheater are normally filled to approximately the levels indicated, by a fluent mass or column of incombustible refractory heat transfer material 40. The heat transfer material is supplied to the upper chamber 22 through the conduit 52 and discharged through the lower chamber 24 through the opening 44. A continuous downward flow of the refractory material 40 through the chamber 22, throat 26 and chamber 24 is maintained by regulable transfer means consisting of a discharge pipe 54 connecting the bottom opening 44 to the housing 56 of a fluid sealing variable speed rotary pocket feeder 58. A motor 70 is adapted to drive the variable speed rotary pocket feeder 58 through a speed reducer and a chain and sprocket connection.

The feeder outlet end is connected through an expansion joint 60 and inclined conduit 62 to a box 64 opening to the lower part of an elevator casing 66. Openings in the box 64 permit the amount of heat transfer medium in the system to be increased or decreased. The elevator casing is of welded gas tight construction and includes an elevator 68 shown as of a slow speed continuous bucket type, having overlapping buckets which are partly filled with heat transfer material at the normal rate of material circulation. The elevator buckets empty into a discharge pipe 72 connected to inlet pipe 52, through an expansion joint 74. With this arrangement a continuous circulation of the heat transfer material can be maintained externally of the fluid heater between the discharge opening 44 and inlet pipe 52 so that the mass or column of heat transfer material within the chambers 22 and 24 and throat 26 will descend at a predetermined rate dependent upon the speed of the feeder 58 and elevator 68.

In the preferred form of apparatus illustrated in Fig. 1 of the drawings, the final heating furnace 80 and the reaction chamber 82 adjoin one another, both being enclosed in the same cylindrical steel casing 84. Both the furnace chamber 80 and the reaction chamber 82 are lined with a special magnesia refractory 86 which will withstand very high temperatures. The two chambers are separated from one another by a special built-out section 88 of the refractory lining forming a restricted venturi-like throat between the two chambers. At the end farthest from the reaction chamber the furnace is provided with an inlet 90 connected to outlet 71 of the preheating furnace by a short well-insulated refractory-lined pipe 73. An annular chamber 92 leading to a series of inlets 94 is provided on the side wall of the furnace for the introduction of fuel whose combustion in the furnace chamber will heat up the preheated air fed through opening 90 to the desired higher temperature before the gases in the chamber pass through the Venturi-like throat where they are uniformly mixed before passing into the reaction chamber 82. An annular chamber 96 leading to inlets 98 provided in the side walls of the refractory chamber permit the introduction of the gaseous material with which the heated nitrogen gas is to combine. At the far end of the reaction chamber there is a restricted opening 100 leading from the reaction chamber to the quench chamber 110 and means (not shown) for collecting the quenched reaction products. A series of high velocity water spray nozzles 112 are provided in the quench chamber in order to permit the shock-cooling of the reaction products as promptly as possible after they leave the reaction zone.

The apparatus described is admirably suited for carrying out continuous gaseous reactions at extremely high temperatures under uniform temperature conditions leading to higher average yields than could be obtained under less ideal conditions. It is, therefore, well adapted for use in the fixation of nitrogen at moderate pressure slightly above that of the atmosphere under simplified construction and operating conditions. It can, for example, be used for the manufacture of nitric oxide from its elements in accordance with the reaction $$O_2 + N_2 = 2NO$$

or from $CO_2$ in accordance with the equation $$N_2 + 2CO_2 = 2NO + 2CO$$

as well as for the manufacture of HCN from a hydrocarbon for example in accordance with either of the following equations $$2CH_4 + N_2 = 2HCN + 3H_2$$

or $$C_2H_2 + N_2 = 2HCN$$

All of the above reactions are highly endothermic, proceed from left to right only at extremely high temperatures, and are readily reversible at intermediate temperatures. Shock cooling of the reaction products is, therefore, highly desirable to insure good average yields.

When the apparatus described is used in accordance with the invention for the production of HCN from methane, for example, the refractory material 40 in the heater is first brought up to temperature by introducing hot gaseous products of combustion into the upper chamber 22 from annular chamber 32 through openings 34 in the arch 36, through the interstices of the stationary refractory bed 38 and tuyère blocks 28. The passage of the combustion gases upwardly in countercurrent flow with the downwardly moving refractory particles and in heat transfer relationship therewith causes the gases to give up their heat content to the refractory material raising its temperature to about 3000 F. The refractory material then passes down through the throat 26 in a heated condition. Air is thereupon continuously introduced at a low temperature and a pressure slightly above atmospheric into the annular inlet chamber 48 through the conduit 50, the air entering the lower chamber 24 throughout the height and circumference of the screen 42. The air then passes upwardly through the interstices in the downwardly flowing highly heated refractory mass. The intimate contact between the ascending air and the descending mass of heat transfer material causes the air to be heated to a temperature above 1800 F., preferably 2500 F., before reaching the upper end of the mass and leaving the preheating furnace through conduit 73 leading to the furnace chamber 80. Upon introduction into the furnace chamber the heated air is mixed with gaseous fuel introduced through annularly arranged ports 94 communicating with the annular supply chamber 92 and rapid combustion takes place because of the high initial temperature of the entering air. The release of heat as the result of this combustion results in the production of gaseous products of high temperature preferably in the neighborhood of 4000 F. as they are mixed in passing through the Venturi-shaped restriction leading to the reaction chamber 82 in which a reactant gas such as methane is introduced through annularly arranged ports 98 communicating with the supply chamber 96.

Upon being brought together and mixed in chamber 82 and the following mixing Venturi throat restriction residual high temperature nitrogen components of the products of combustion and the methane react at the existing temperature which is above 3000 F. to form HCN in accordance with the previously given reaction. Following the mixing throat and at a spaced position therefrom in an angularly arranged quenching chamber 110 the reaction products and residual products of combustion are shock-chilled by a spray of water or other suitable fluid of high heat absorptive capacity to a temperature below 400 F.

The interposition of the throat and the change of direction in the gas passage between the chamber 82 and the quenching zone is advantageous in avoiding premature cooling of the reaction products by substantial radiant heat transfer to the low temperature quenching zone.

Under some circumstances it may be found advisable to use methane as the gaseous fuel to be burned in chamber 80 to further increase the temperature of the nitrogenous gases coming from the preheating furnace. To take full advantage of this, the air flow controls should be adjusted so that there would be a deficiency of oxygen for complete combustion of the methane but a sufficiently high inlet temperature which together with the heat of combustion of the portion of the methane burned in both chambers 80 and 82 assures that any methane present therein would start to form HCN. In this manner HCN would be formed at two distinct stages of the process. The first batch would be formed from the residual methane fed into chamber 80 over and above that required for combustion and would be formed prior to or as the gaseous materials were passing through the Venturi-like throat into chamber 82. The second batch of HCN would, of course, be formed in chamber 82 in the same manner as described for the case in which the fuel burned in chamber 80 is not methane. In fact, the processes from there on are identical.

The temperature of the products of combustion developed in chamber 80 may be desirably effected by the regulation of the temperature of the preheated air by the customary control of the rate of pebble circulation through the lower chamber 24 and the rate of heat input into chamber 22 as related to the rate of air flow through chamber 24 to the combustion chamber 80 and by the control of the rate of fuel input into the latter. The rate of input of reactant gas through ports 96 may be adjusted to attain the optimum degree of reaction when considering the temperature of the products of combustion.

When the reaction is carried out in the above described manner yields of HCN in the neighborhood of 40% can be obtained. If acetylene is substituted for methane the corresponding yield is over 60%. As can readily be seen these yields compare very favorably with the 1 and 2% yields now obtainable by the heretofore used commercial process of fixing atmospheric nitrogen.

Apparatus of the type shown in Fig. 1 of the drawings is particularly well adapted for carrying out reactions at extremely high temperatures, as well as reactions in which the product might be ticklish to handle. It confines that portion of the apparatus where temperatures are extremely high to a relatively small and easily isolated unit. Thus magnesia refractories which will withstand the essential high temperatures involved but which are structurally fragile are well adapted to use in relatively small and compact furnace constructions. Confining the reaction chamber to a small and easily isolated unit also facilitates the handling of potentially dangerous products, such as HCN, in a safe manner. As can readily be seen, it tends to make for ideal mixing of the gases at the time of the reaction, as well as to make it easy to provide adequate quenching facilities to take care of the reaction products as they are produced.

The medium used for quenching is usually water, however, it is sometimes desirable to use an alkaline solution adapted to more securely tie up the HCN in the form of a salt as well as quench it.

The pertinent parts of the apparatus diagrammatically shown in Fig. 2 with the exception of the combustion chamber 123 in which the fuel is burned prior to its introduction into the top chamber proper are substantially the same as those of the preheating furnace shown in Fig. 1. Although the combustion of the hot air and fuel could be carried out in a separate combustion chamber and brought into the furnace in the manner shown in Fig. 1 of the drawings, satisfactory results are obtainable with the use of an annular combustion chamber of the type described in the co-pending application of E. G. Bailey and R. M. Hardgrove for Fluid Heaters filed September 16, 1943, now Patent No. 2,447,306, issued August 17, 1948. This combustion chamber 123 is shown diagrammatically in Fig. 2 of the drawings of this application. In the arrangement shown in Fig. 2 the lower chamber 120 of the fluid heater is adapted to heat the entering air all the way up to the preferred temperature at which it should be fed into the reaction chamber, namely about 4000 F., while the upper chamber 122 is adapted for use as a cooling chamber for fixed nitrogen compounds formed in the combustion chamber as well as a heating chamber for the moving bed of refractory heat transfer material. The only other structural differences between the furnace shown here and the preheating furnace of Fig. 1 is in the composition of the refractory wall, the by-pass 124 in the exit pipe 126 leading to the upper chamber and the unit 128. Since the temperatures in this furnace are necessarily higher than in the furnace used merely as a preheater the refractory walls must necessarily be capable of withstanding higher temperatures. It is, therefore, desirable to use a more expensive but higher temperature magnesia brick in the wall lining. The pipe 126 leading the heated air from the upper part of the lower chamber 120 feeds most of the air up into the annular combustion chamber 123 where it is used to support the combustion of the fuel entering through pipe 130. The combustion gases so formed enter chamber 122. A bleed off valve 132 is provided in pipe 126 for taking off a portion of the heated air leaving the lower chamber 120. This air is fed into unit 128 which is a simple reaction chamber lined with high temperature magnesia brick and provided with an annular chamber 134 and ports 136 throughout an annular section to permit the introduction of a reactant gas such as methane. A restricted opening 138 at the far end of the reaction chamber 140 leads to a quench chamber 142 provided with an annular series of high pressure water spray nozzles 144 adapted to shock cool the gaseous reaction product.

The extremely high temperatures which are necessary if the desired reactions are to take place are obtained in the pebble heater by utilization of the return of heat by regenerative recovery whereby the temperature level or gradient is raised substantially. This method depends upon bringing some of the heat energy recovered in the lower chamber of the furnace back up into the upper chamber to help increase its heat content. Since the temperature of the combustion products will increase as the temperature of the preheated air used to burn the fuel increases, the temperature of the refractory particles heated thereby will also rise. The increase in temperature of the moving bed will in turn cause an increase in the exit air temperature of the lower bed. If, therefore, sufficient pebble depth or large enough quantities are provided to prevent sensible heat losses at the furnace exits, and if the walls are well insulated, the limit on temperature obtainable within the furnace would appear to be that point where the gas equilibrium is such that the endothermic reactions of the dissociation and nitric oxide formation in accordance with the reaction illustrated by the following equation—$\frac{1}{2}N_2 + CO_2 = NO + CO$—balance the input of the fuel and hot air. Since this point appears to be somewhat over 5000 F., an excess of air can preferably be used in the lower chamber and let off through valve 132 before the preheated air enters the combustion chamber 123. Under these conditions nitrogen containing gases can be removed from the system through valve 132 at temperatures in excess of 4000 F. These gases can then be led to a suitable reaction chamber 140 where any of the above indicated reactions can be carried out to obtain commercially satisfactory yields.

It can therefore readily be seen that the arrangement of apparatus diagrammatically shown in Fig. 2 can be used to fix atmospheric nitrogen in two distinctly separate reaction chambers in accordance with one or two reactions. For example, the fluid heater can be brought up to temperature by heating the downwardly moving mass of heat exchange material by direct contact with combustion gases passing upwardly through the interstices in the mass and out through the exit pipe 146 at the top of the chamber. As the heated heat exchange material moves downwardly through the lower chamber 120 after having passed through throat 148 it gives up its heat to the air introduced through inlet 150 into the lower portion of the chamber as it flows upwardly through the interstices in the flowing mass of heat exchange material passing downwardly through the furnace. As the heated air is led from the lower chamber to chamber 123 where it supports the combustion of the fuel it soon raises the temperatures of the combustion products and subsequently the temperatures in both upper and lower chambers 120 and 122 in accordance with the heretofore described regenerative recovery principle.

When equilibrium has been reached the nitrogen of the air introduced into the combustion chamber 123 of the fluid heater through by-pass 124 will react with the $CO_2$ formed as a product of combustion to form NO at the existing temperatures within the combustion zone in accordance with the equation $\frac{1}{2}N_2 + CO_2 = NO + CO$. As these products move into chamber 122 and upwardly therethrough they dissipate their heat content by transferring it to the downwardly descending mass of pellets, as they come into intimate contact with them. The nitric oxide so formed can then be removed from the cooled gases leaving the top of the chamber 122.

As has been previously stated when equilibrium has been reached the lower chamber will be able to heat more air to a temperature of approximately 4000 F. than can be used advantageously in carrying out the above reaction. The excess hot air so obtained can therefore be bled off as it leaves the lower chamber and led into a small reaction unit 128 connected with the bleed-off valve 132. The hot air so introduced can be brought into admixture with a hydrocarbon vapor such as methane fed in through annular chamber 134 and inlet 136 which will react at the temperatures existing in the reaction chamber 140 preferably in the neighborhood of 3000 F. to form HCN in accordance with the equation $$\frac{1}{2}N_2 + CH_4 = HCN + \frac{3}{2}H_2$$

After these products leave the reaction zone through the restricted opening 138 they are shock-chilled by coming into contact with the high velocity water spray 144 in the quench chamber 142, after which they are led to a point at which the HCN is recovered in a manner not shown.

The diagrammatic arrangement of apparatus illustrated in Fig. 3 of the drawings shows still another method in which the moving bed type heaters can be used to fix atmospheric nitrogen. As can readily be seen, these heaters are similar in structure to the fluid bed type heater illustrated in Figs. 1 and 2 of the drawings. In the arrangement shown in Fig. 3, two of these moving bed heaters are hooked in series. In the first heater 160 illustrated the moving heat transfer mass in the upper chamber 162 is heated in the usual manner by combustion gases entering the bottom of the chamber through inlet 164 and passing upwardly through the interstices between the countercurrent downwardly flowing heat transfer mass. Air to be preheated enters the bottom of the lower chamber through inlet 166 and flows upwardly therethrough between the interstices of the downwardly flowing mass of heat transfer material. During its upward flow in heat exchange relationship with the hot heat transfer material it becomes preheated and is finally withdrawn from the lower chamber through conduit 168 which leads the preheated air into the annular combustion chamber 167, at which point it supports the combustion of fuel entering the chamber at this point through conduit 169. The combustion products so formed enter chamber 170 where they transfer their heat in the usual manner to the downwardly moving bed of refractory heat transfer material, as the combustion products pass upwardly therethrough in heat exchange relationship with the fluid mass. In accordance with the arrangement shown in Fig. 3 the temperatures obtained in the combustion chamber 167 of the second fluid heater are higher than those obtained in the combustion furnace feeding gases to chamber 162 and are sufficiently high that some of the nitrogen in the gases will be converted to nitric oxide in accordance with the reaction shown by the following equation: 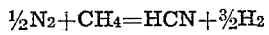 $\frac{1}{2}N_2 + CO_2 = NO + CO$. The resulting gases withdrawn from top of both the first and second fluid heaters are then circulated and brought into the bottom of the lower chamber 172 of the second heater, after the nitric oxide, water vapor and $CO_2$ have been removed in a suitable manner in a series of operations shown diagrammatically as 174 in the drawings. In this manner substantially pure nitrogen can be used as the feed to this lower bed from inlet 176. This gas may be caused to come into intimate contact with methane added at other points in the chamber 172 through inlets such as shown at 178. The mixed gases coming into contact with the hot pebbles moving downwardly through the chamber are caused to react before being withdrawn from the furnace at the upper bed of the lower chamber through pipe 180. The gases so withdrawn are quickly quenched by some suitable means.

The uniformity of temperature and fluent flow conditions obtainable with the apparatus and method of this invention is conducive to the obtaining of higher average yields of desired products and simpler operation than would be obtained with apparatus and methods operating under stop and go characteristics or temperature fluctuations.

While the above description and the drawings submitted herewith disclose preferred and practical embodiments of my novel method and apparatus for fixing nitrogen, it will be understood by those skilled in the art that the specific details of method described as well as the construction and arrangement of parts as shown and described, are by way of illustration and are not to be construed as limiting the scope of the invention.

What is claimed is:

1. The method of producing nitrogen compounds comprising continuously preheating a stream of air by continuously passing the air stream upwardly through a descending stream of heated solid inert refractory material in the lower chamber of a moving bed type of heater having an upper chamber in which the refractory material is heated; continuously withdrawing the heated air from the upper end of the lower chamber; utilizing the oxygen component of the withdrawn heated air to support combustion of a fuel to supply heat requirements of the method; reacting the nitrogen component of the withdrawn heated air with an introduced hydrocarbon gas to form HCN; and separating the HCN from the stream.

2. The method of producing nitrogen compounds comprising continuously preheating a stream of air by continuously passing the air stream upwardly through a descending stream of heated solid inert refractory material in the lower chamber of a moving bed type of heater having an upper chamber in which the refractory material is heated; continuously withdrawing the heated air from the upper end of the lower chamber; utilizing the oxygen component of the withdrawn heated air to support combustion of a fuel to further heat the moving stream and leave substantially only heated nitrogen therein; then reacting the heated nitrogen with an introduced hydrocarbon gas to form HCN; and separating the HCN from the stream.

3. The method of producing nitrogen compounds comprising continuously preheating a stream of air by continuously passing the air stream upwardly through a descending stream of heated solid inert refractory material in the lower chamber of a moving bed type of heater having an upper chamber in which the refractory material is heated; continuously withdrawing the heated air from the upper end of the lower chamber; leading a portion of the withdrawn air into the upper chamber to support combustion of a fuel introduced thereinto to heat the refractory material therein; reacting the heated nitrogen component of such portion of the stream led into the upper chamber with the $CO_2$ resulting from the combustion to produce NO and CO; withdrawing the stream portion from the upper chamber; separating the NO from the stream portion; introducing a hydrocarbon gas into the remainder of the stream withdrawn from the lower chamber for reaction with the nitrogen component to form HCN; and separating the HCN from the stream.

4. The method of producing nitrogen compounds comprising continuously preheating a stream of air by continuously passing the air stream upwardly through a descending stream of heated solid inert refractory material in the lower chamber of a first moving bed type of heater having an upper chamber in which the refractory material is heated; burning a fuel in the upper chamber of the heater to heat the refractory material therein; continuously withdrawing the heated air from the upper end of the lower chamber; leading the withdrawn heated air from the lower chamber to a combustion chamber communicating with the upper chamber of a similar moving bed type of heater; utilizing the oxygen component of the heated air to support combustion of a fuel introduced into the combustion chamber; continuously passing the stream from the combustion chamber into the upper chamber of the second heater to heat the refractory material therein; reacting the nitrogen component of the stream with the $CO_2$ produced by the combustion in both upper chambers to form NO and CO; separating the reaction products from the stream; introducing the remaining nitrogen of the stream into the lower end of the lower chamber of the second heater to flow upwardly through the descending stream of refractory material therein to heat the nitrogen and hydrocarbon gas to react to produce HCN; withdrawing the stream from the upper end of the second lower chamber; and separating the HCN from the stream.

CHARLES L. NORTON, Jr.

REFERENCES CITED

The following references are of record in the file of this patent:

UNITED STATES PATENTS

| Number | Name | Date |
| --- | --- | --- |
| 814,917 | Pauling | Mar. 13, 1906 |
| 873,891 | Pauling | Dec. 17, 1907 |
| 882,958 | Pauling | Mar. 24, 1908 |
| 1,321,892 | Crowell | Nov. 18, 1919 |
| 1,348,175 | Hidden | Aug. 3, 1920 |
| 1,466,604 | Springmann | Aug. 28, 1923 |
| 2,043,930 | Millar | June 9, 1936 |
| 2,399,450 | Ramseyer | Apr. 30, 1946 |
| 2,421,744 | Daniels | June 10, 1947 |
| 2,422,081 | Cottrell | June 10, 1947 |
| 2,447,306 | Bailey | Aug. 17, 1948 |
| 2,449,601 | Gohr | Sept. 21, 1948 |